(12) United States Patent
Petrunka (10) Patent No.: US 8,737,973 B1
(45) Date of Patent: May 27, 2014

(54) ENHANCED VOICE CALLING USING SMART PHONE SERVICES

(71) Applicant: Robert W. Petrunka, Raleigh, NC (US)

(72) Inventor: Robert W. Petrunka, Raleigh, NC (US)

( * ) Notice: Subject to any disclaimer, the term of this patent is extended or adjusted under 35 U.S.C. 154(b) by 0 days.

(21) Appl. No.: 13/947,402

(22) Filed: Jul. 22, 2013

(51) Int. Cl.
  *H04M 3/42* (2006.01)
(52) U.S. Cl.
  USPC ... 455/414.1; 455/428; 455/406; 379/114.24; 379/220.01; 379/221.13
(58) Field of Classification Search
  USPC .................. 455/414.1, 428, 406; 379/114.24, 379/220.01, 221.13
  See application file for complete search history.

(56) References Cited

U.S. PATENT DOCUMENTS

| | | | | |
|---|---|---|---|---|
| 5,905,791 | A * | 5/1999 | Goel et al. | 379/211.02 |
| 6,442,242 | B1 * | 8/2002 | McAllister et al. | 379/67.1 |
| 6,459,783 | B1 | 10/2002 | March et al. | |
| 6,795,852 | B1 * | 9/2004 | Kleinrock et al. | 709/220 |
| 7,212,629 | B2 * | 5/2007 | Lennon et al. | 379/447 |
| 7,353,016 | B2 | 4/2008 | Roundtree et al. | |
| 8,363,807 | B2 | 1/2013 | Baciu et al. | |
| 2005/0041795 | A1 * | 2/2005 | Goldstein et al. | 379/221.13 |
| 2007/0071196 | A1 * | 3/2007 | Ward | 379/114.03 |
| 2007/0198339 | A1 * | 8/2007 | Shen et al. | 705/14 |
| 2007/0206742 | A1 * | 9/2007 | Giaccherini et al. | 379/114.24 |
| 2007/0248222 | A1 * | 10/2007 | Wolmuth | 379/218.01 |
| 2007/0253547 | A1 | 11/2007 | Sanchez et al. | |
| 2007/0291783 | A1 * | 12/2007 | Faber et al. | 370/461 |
| 2008/0025294 | A1 * | 1/2008 | Elliott et al. | 370/356 |
| 2008/0049928 | A1 * | 2/2008 | Miloslavsky et al. | 379/265.09 |
| 2008/0310399 | A1 * | 12/2008 | Narayanan et al. | 370/352 |
| 2008/0310614 | A1 * | 12/2008 | Ward | 379/221.14 |
| 2009/0016507 | A1 * | 1/2009 | Altberg et al. | 379/114.01 |
| 2009/0041225 | A1 * | 2/2009 | Agarwal et al. | 379/221.13 |
| 2009/0046843 | A1 * | 2/2009 | Baciu et al. | 379/201.02 |
| 2010/0191608 | A1 * | 7/2010 | Mikkelsen et al. | 705/26 |
| 2011/0289064 | A1 * | 11/2011 | Lebeau et al. | 707/706 |
| 2012/0179524 | A1 * | 7/2012 | Altberg et al. | 705/14.7 |
| 2013/0188785 | A1 * | 7/2013 | Zhakov | 379/90.01 |
| 2013/0195102 | A1 * | 8/2013 | Kyle | 370/352 |

FOREIGN PATENT DOCUMENTS

| | | | | |
|---|---|---|---|---|
| WO | WO 2009/036589 | * | 9/2007 | H04M 11/06 |
| WO | WO 2013/059480 | * | 10/2012 | H04Q 3/70 |

* cited by examiner

*Primary Examiner* — Sharad Rampuria
*Assistant Examiner* — Mong-Thuy Tran
(74) *Attorney, Agent, or Firm* — Louis Ventre, Jr.

(57) ABSTRACT

A system and method for enhancing voice telephone communications from a smart phone. The method is implemented on an app for a smart phone. Steps include capturing digits dialed on the smart phone; establishing a data connection with a database external to the smart phone; transmitting to the database the digits dialed on the smart phone; a telephone number for calling the smart phone; and any multimedia capabilities of the smart phone. Additional steps include receiving at the smart phone: a second telephone number sent from the database and any multimedia information accessible to the smart phone; displaying the multimedia information on the display screen when such multimedia information is displayable; and using the second telephone number received from the database to cause the smart phone to establish a voice connection through the public switched telephone network as if the second telephone number had been dialed by the user.

12 Claims, 4 Drawing Sheets

Method: for enhancing voice telephone communications from a smart phone, the smart phone comprising a display screen and nontransitory memory storing computer readable program code adapted to be executed on the smart phone to implement steps enhancing voice telephone services to a user dialing a telephone number
100

Capturing step: capturing digits dialed on the smart phone
105

Establishing step: establishing a data connection with a database external to the smart phone and accessible to the smart phone using network access, said data connection based upon the digits dialed on the smart phone
110

Transmitting step: transmitting to the database from the smart phone:
 the digits dialed on the smart phone;
 a telephone number for calling the smart phone; and
 any multimedia capabilities of the smart phone, said multimedia capabilities
  comprising: a codec supported by the smart phone, a data address associated with
  the smart phone, and data necessary to enable provision of multimedia service via
  the smart phone
115

Receiving step: receiving at the smart phone:
 a second telephone number sent from the database, said second telephone number
  derived from the digits dialed on the smart phone; and
 any multimedia information accessible to the smart phone
said receiving occurring on one of two events consisting of: when such second telephone number is sent from the database; and when such second telephone number and multimedia information are sent from the database
120

Making step: making a voice call through a public switched telephone network using the digits originally dialed by the user, said making occurring automatically and without user action when the second telephone number or any such multimedia information: is not sent to the smart phone from the database; or
is not sent to the smart phone from the database within a defined period of time
125

Displaying step: displaying the multimedia information on the display screen when such multimedia information is displayable
130

Using step: using the second telephone number received from the database to cause the smart phone to establish a voice connection through the public switched telephone network as if the second telephone number had been dialed by the user
135

ENHANCED VOICE CALLING USING SMART PHONE SERVICES

TECHNICAL FIELD

In the field of telephonic communications, a system and method providing an additional data service engaged beforehand and enhancing subsequent switching, connection, or control functions additional to those necessary to establish and maintain a single call connection between stations.

BACKGROUND ART

Since the invention of the telephone in the nineteenth century, telephone companies have efficiently and effectively provided voice communication services to customers worldwide. Telephones are ubiquitous and easy to use. Since the advent of powerful data communications technology, it has been a goal of the industry to provide a multimedia capability (such as video and voice) that will eventually be as ubiquitous as the telephone is today.

Some vendors, such as SKYPE, attempt to do so by bypassing the existing Public Switched Telephone Network and providing a solution reliant only on data technology. However, such solutions have deficiencies in alerting terminating parties and interoperability with existing Public Switched Telephone Network subscribers.

The telecommunication industry has been developing a capability called Internet protocol Multimedia Services which essentially replaces the core of the Public Switched Telephone Network with components capable of supporting multimedia services. This effort has been proceeding for over a decade at great cost with limited success due to the complexity of the solution.

The term Public Switched Telephone Network not only refers to legacy telephone companies, which use analog lines to connect to subscribers but it also includes wireless companies and telephone companies that use data access methods to connect to customers once the call is dialed by the caller.

In providing traditional phone services, for example toll-free calling, a customer uses a phone to place a toll-free call by dialing a number, which begins with toll-free leading digits such as 800 or 877. The call is routed via a telephone line to a telephone switch in the Public Switched Telephone Network. This is important because the method and system of the invention avoids the Public Switched Telephone Network in a front end series of steps.

Traditionally, once a call has been dialed, the Public Switched Telephone Network does all of the data acquisition and connections, which may involve intermediate switches. The key functionality for toll-free calling using the Public Switched Telephone Network is in connecting the call dialed on the phone to a Service Switching Point which then interacts with a Service Control Point all within the Public Switched Telephone Network.

Once a call has reached a telephone switch in the Public Switched Telephone Network, which has Service Switching Point capability, the switch launches a database query using a data connection to the Service Control Point also in the Public Switched Telephone Network. For example, using the toll-free example, the database query accesses toll-free routing data.

The Service Control Point is one of multiple database end points in the Public Switched Telephone Network, which house toll-free number data and which are connected using a data network, which is typically built using Signaling System 7 technology. Signaling System No. 7 is a set of telephony signaling protocols which are used to set up most of the world's public switched telephone network telephone calls. The main purpose is to set up and tear down telephone calls. Other uses include number translation, local number portability, prepaid billing mechanisms, short message service, and a variety of other mass market services.

The present invention does not use telephone company facilities to carry messages using Signaling System 7 technology in the front end processing because the front end processing avoids using the Public Switched Telephone Network. While enhanced SS7 processing utilizing Internet protocol technology may be adapted to run over the Internet from a smart phone, the difference is that no Public Switched Telephone Network servers would be used.

In providing traditional phone services, the Service Control Point returns the actual called number that the business owner of the toll-free number wishes the call to be routed to, back to the Service Switching Point in the Public Switched Telephone Network. The Service Switching Point then routes the call through the Public Switched Telephone Network until it ultimately reaches the destination telephone. In the toll-free calling example, the caller is not billed for the phone call. Cell phone customers may be charged for minutes of use. However, the business owner of the toll-free number is billed by the telephone company.

In traditional toll-free communications processes, there may be multiple layers of Service Control Point processing. A Local Exchange Carrier in the Public Switched Telephone Network may launch an initial query through a data network towards a Local Exchange Carrier Service Control Point to first determine which Inter Exchange Carrier "owns" the toll-free number. The call is then forwarded from a Local Exchange Carrier Service Switching Point to an Inter Exchange Carrier Service Switching Point. At this point, the Inter Exchange Carrier Service Switching Point sends a data query through a data network to an Inter Exchange Carrier Service Control Point which returns the called number toward which the business owner of the toll-free number wishes the call directed.

Wireless phone customers are increasingly using "Smart Phones" which are cell phones that have computing capability and a data communication capability. These phones not only enable the customer to make a voice phone call, they also enable customers to access data networks by utilizing applications, or "apps", that can be downloaded from an "app store" into the smart phone. This vastly increases the utility of the cell phones to the customers.

A large number of businesses around the world provide free voice telephone access to their customers by providing their customers with access numbers which are toll free to the callers. In some countries this is called Free Phone.

Other terms may be used to describe the same capability. Examples of such numbers in North America are 10 digit telephone numbers beginning with 800 or 877. When a caller dials a toll-free number, software in the Public Switched Telephone Network queries a network of databases. The result returned from the database query is the actual telephone number to which the business wants the call completed such as a call center location. The call is then routed through the Public Switched Telephone Network to the location.

SUMMARY OF INVENTION

A system and method for enhancing voice telephone communications from a smart phone, introduces competition for traditional toll-free telephone service providers. The method is implemented on an app for a smart phone, on software on a computer servicing the method, and possibly on the app at the destination of the phone call. Steps include capturing digits dialed on the smart phone; establishing a data connection with a database external to the smart phone; transmitting to the database from the smart phone: the digits dialed on the smart phone; a telephone number for calling the smart phone; and any multimedia capabilities of the smart phone. Additional steps include receiving at the smart phone: a second telephone number sent from the database and any multimedia information accessible to the smart phone; displaying the multimedia information on the display screen when such multimedia information is displayable; and using the second telephone number received from the database to cause the smart phone to establish a voice connection through the public switched telephone network as if the second telephone number had been dialed by the user. Optional steps include limiting the start of the method to circumstances when predetermined digits are dialed by the user such as toll free numbers; allowing the predetermined digits to be altered by the user or other person having access to the smart phone; and requiring manual activation of the app.

The system includes the computer and database that receives the data from the smart phone and returns the second number. The system may also enable direct multimedia data communication between the destination of the call and the calling smart phone.

Technical Problem

Current technologies provide a monopoly to the telephone companies in charging business customers for toll-free calling. This happens because the processing of toll-free calls occurs in the Public Switched Telephone Network. Competition with the operators of the Public Switched Telephone Network is therefore eliminated.

Because data communications involving toll-free calling are presently activated after the caller accesses the Public Switched Telephone Network and no data is exchanged with the smart phone used to originate the call, this existing process does not provide a mechanism for the toll-free business owner to communicate with its customer other than by voice and Dual Tone Multiple Frequencies tones.

A limitation with today's smart phone deployment is that customers either use their cell phone to make a voice call or to utilize an app. There is nothing that presently enables a smart phone customer to access a data application during a voice call thereby enabling enhanced services, such as for example, the potential for multi-media in toll-free voice calls.

While a toll-free call is free to the caller, the telephone company, which provides this service, charges a fee to the business to utilize the legacy toll-free equipment.

Solution to Problem

The solution lies in providing a data connection to existing voice calls outside the Public Switched Telephone Network. The data connection is made first at the originating phone and later at the terminating or destination phone. By doing so, existing phone calls are enhanced, but not replaced because a voice call through the Public Switched Telephone Network is still made, only later in the process and using a number that is not necessarily dialed in the first instance by the caller.

The issue of alerting the destination phone is solved since called phone rings in the usual way because actual dialed call is made by dialing standard telephone numbers through the Public Switched Telephone Network. The costs of the solution are minimized since existing voice Public Switched Telephone Network components continue to be used, just not exclusively, which is key to enabling competition to the telephone companies in charges made for toll-free service and to providing multimedia services that enhance the toll-free system.

Three embodiments described herein illustrate how the addition of a data connection to existing voice calls can enable multimedia capability. In the first instance, a data connection is only used on the originating phone and only for toll-free numbers. In the second example, a data connection is added to the destination or terminating end of the toll-free call. The third embodiment illustrates how multimedia processing can occur between any two parties (i.e. not a toll-free call).

This invention enables a smart phone customer to access a data application during a voice call thereby enabling enhanced services.

Advantageous Effects of Invention

Data connectivity has been added to many devices which are used to make voice phone calls. Wireless phone customers are increasingly using "Smart Phones" which are cell phones that have computing capability and a data communication capability. These phones not only enable the customer to make a voice phone call, they also enable customers to access data networks by utilizing applications, or "apps", that can be downloaded from an "app store" into the smart phone. This vastly increases the utility of the cell phones to the customers. However, a limitation with today's deployment is that customers either use their cell phone to make a voice call or to utilize an app.

Utilizing a data network apart from the Public Switched Telephone Network, such as the Internet, the availability of computing technology in network endpoints such as in Smart Phones, such as an IPHONE, and the leveraging economics of telephone voice service to provide toll-free telephone calls, which bypass the legacy toll-free infrastructure, in competition to the public telephone companies and also at the same time enable enhanced toll-free services to businesses and callers.

BRIEF DESCRIPTION OF DRAWINGS

The drawings illustrate preferred embodiments of the method of the invention and the reference numbers in the drawings are used consistently throughout. New reference numbers in FIG. 2 are given the 200 series numbers. Similarly, new reference numbers in each succeeding drawing are given a corresponding series number beginning with the figure number.

FIG. 1 is a chart illustrating the steps in the method implemented by a smart phone.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention. For example, the steps in the method of the invention may be performed in any order that results in enhanced voice telephone communications from a smart phone. This flexibility in the order of the steps shown in the figures is indicated by arrows that are not from one box to the next but rather from a flow line at the side. Where the step shown in a chart necessarily follows from a prior step, that is, it is dependent from the prior step, then there is an arrow from the box around the prior step to the box around the dependent step.

FIG. 1 charts the steps in a method (100) for enhancing voice telephone communications from a smart phone (305). A smart phone (305) predominantly means a wireless telecommunications device with computing capability, data transfer capability and a display screen. But other combinations of technology that accomplish the same thing can also be considered a smart phone. As used and defined herein, a smart phone (305) means any telecommunications device with computing capability, data transfer capability and a display screen capability that can initiate a standard voice telephone call, including a landline phone having a display screen capability, computing capability and data transfer capability either built in or provided by an associated personal computer or tablet.

The smart phone (305) has a display screen and nontransitory memory storing computer readable program code adapted to be executed on the smart phone (305) to implement steps enhancing voice telephone services to a user dialing a telephone number. This nontransitory memory is a hardware device, typically called a non-volatile memory card. The memory card is usually removable from the smart phone (305), but may be non-removable memory.

The method (100) has steps shown in FIG. 1, including a: capturing step (105); establishing step (110); transmitting step (115); receiving step (120); making step (125); displaying step (130); and a using step (135).

Figure 2:
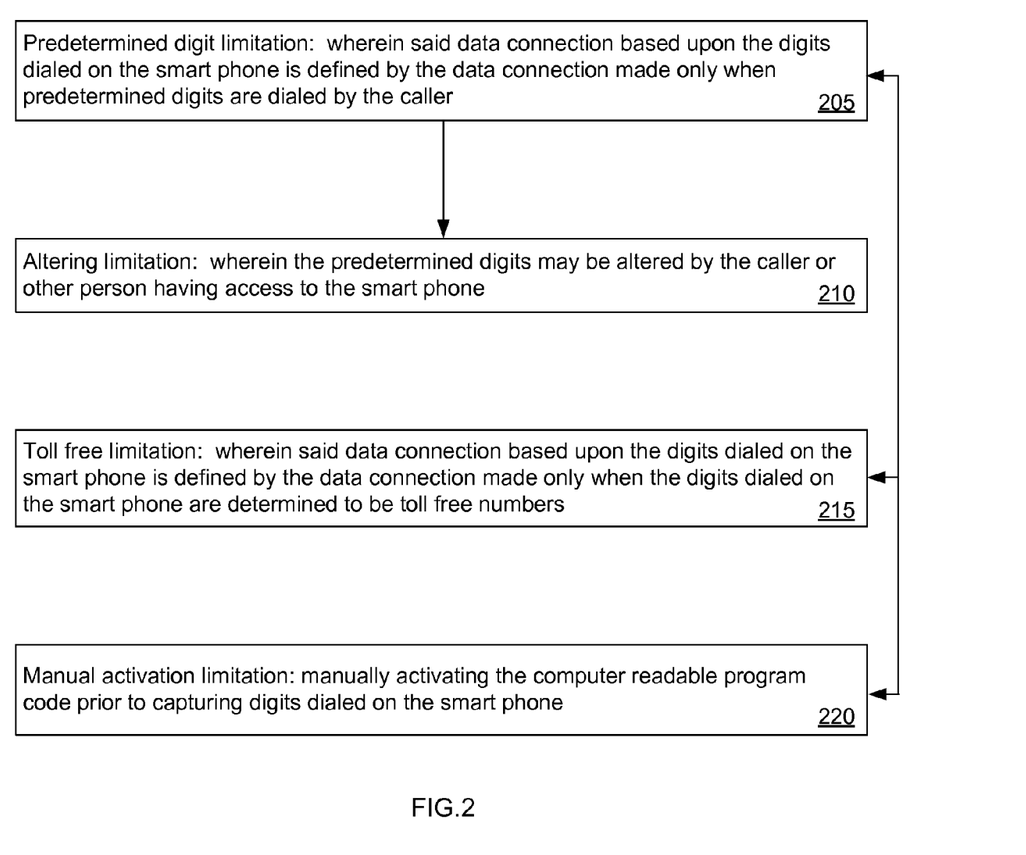
FIG. 2 is a chart illustrating optional added steps in the method.

The application implementing the method (100) may be automatically engaged each time a number is dialed on the smart phone (305), or it may be manually activated by the user or caller. Thus, there is preferably an option for the caller or user of the smart phone (305) to manually activate the smart phone (305) application implementing the method (100). This is called the manual activation limitation (220).

The capturing step (105) is capturing digits dialed on the smart phone (305). Typically, a user or caller making a voice call will first enter the numbers dialed and then push a button on the phone to access the Public Switched Telephone Network (340). The smart phone captures the digits dialed before they are actually transmitted. In the same way, the smart phone (305) captures the numbers dialed by the user. Dialed numbers may be stored in the nontransitory memory in the smart phone (305); or simply captured and held in additional volatile memory.

Figure 3:
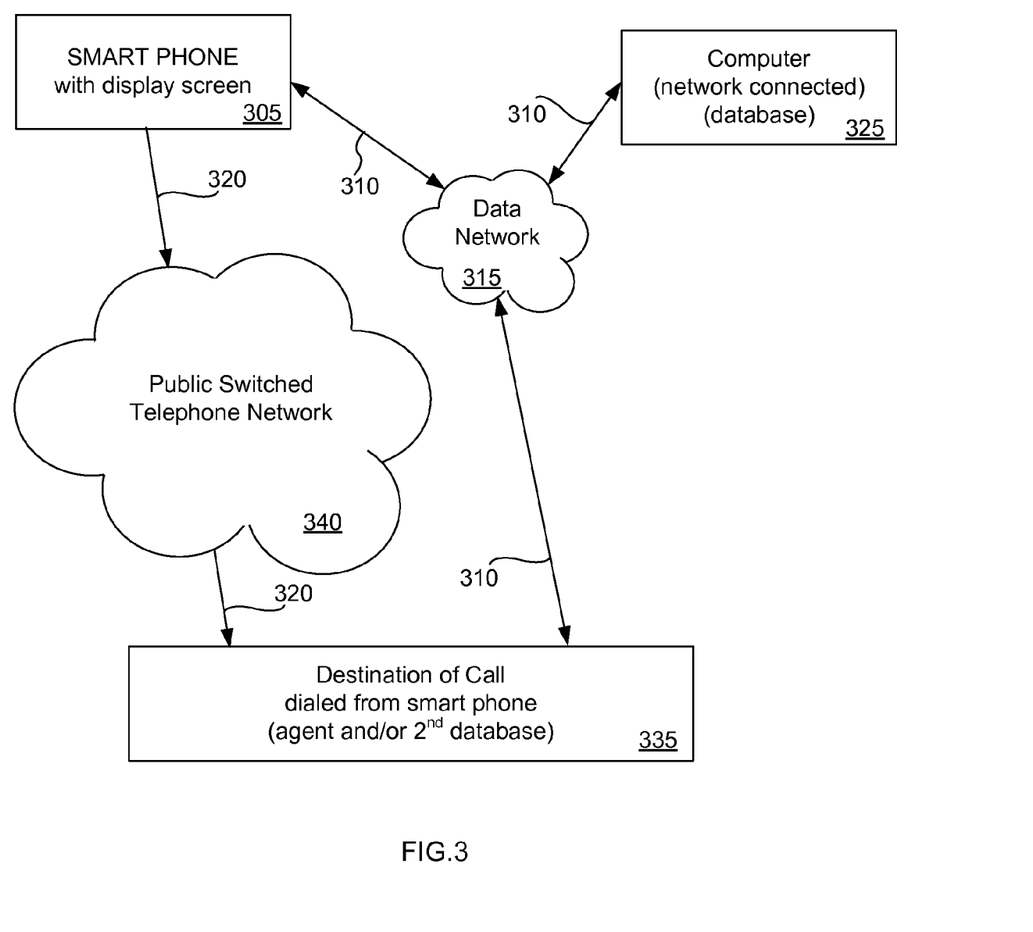
FIG. 3 is an illustration of system component interactions.

The establishing step (110) requires the smart phone (305) to establish a data connection without transmitting the dialed numbers to the Public Switched Telephone Network (340). Typically, this step means that when the user or caller pushes the button to make the call, the smart phone (305) performs the step of establishing a data connection (310) with a database external to the smart phone (305) and accessible to the smart phone (305) using network access. Network access is essentially a data network (315) like the Internet. This external database preferably resides on a computer (325). The data connection (310) is based upon the digits dialed on the smart phone (305). The limitation "based upon the digits dialed on the smart phone (305), usually means based on a complete phone number dialed by the user.

However, it conceivably may be based on less than all the numbers dialed, or only when specific area codes are called, to provide some generic service, for example, if 1-800 is dialed. Thus, in some embodiments, this step may be limited so that the data connection (310) is made only when predetermined digits are dialed by the user. This is the predetermined digit limitation (205) shown in FIG. 2.

An example of the predetermined digit limitation (205) is the toll-free limitation (215). The expression "based upon the digits dialed on the smart phone (305)" may mean that a data connection (310) is established only when the digits dialed on the smart phone (305) are determined to be toll-free numbers.

Also, the caller or user may wish to limit the data connection to specific digits dialed so it would be useful in some embodiments to permit the user to change the predetermined digits or regulate what happens when predetermined digits are dialed. And the user may wish to download a program patch that is based on some action using predetermined digits. Thus, an altering limitation (210) is that the predetermined digits may be altered by the user or other person having access to the smart phone (305).

The transmitting step (115) requires the smart phone (305) to transmit or send the numbers dialed to the database and also transmit the capabilities of the smart phone regarding audio and visual display capabilities, such as a codec that is operable on the smart phone (305). A codec is a device or computer program capable of encoding or decoding a digital data stream or signal.

Thus, the smart phone (305) performs a step of transmitting to the database from the smart phone (305): the digits dialed on the smart phone (305); a telephone number for calling the smart phone (305); and any multimedia capabilities of the smart phone (305). The multimedia capabilities comprising: a codec supported by the smart phone (305), a data address associated with the smart phone (305), and data necessary to enable provision of multimedia service via the smart phone (305). The multimedia capabilities may include global positioning system capabilities supported by the smart phone (305). When such global positioning system capabilities are supported by the smart phone (305), the smart phone (305) may additionally send the global positioning system coordinates of the smart phone (305).

The receiving step (120) involves receiving data at the smart phone (305) when it is sent from the computer (325) holding the database. Typically, the data is sent by the computer (325) that was sent the numbers dialed on the smart phone (305). This data sent from the computer (325) or database would typically be a non-toll-free number that the smart phone (305) may dial to access the business. The computer (325) may also direct that data be sent from other locations, such as for example, multimedia information available from the business sought to be called by the user dialing a toll-free number.

Thus, the receiving step (120) includes receiving at the smart phone (305): a second telephone number sent from the database, said second telephone number derived from the digits dialed on the smart phone (305); and any multimedia information accessible to the smart phone (305); said receiving occurring on one of two events consisting of: when such second telephone number is sent from the database; and when such second telephone number and multimedia information are sent from the database. The receiving step (120) only takes place upon the occurrence of one the two listed events, namely if the second telephone number is sent from the database or if the second telephone number and multimedia information are sent from the database. This may be obvious because if nothing is sent from the database, then logically nothing is received at the smart phone (305). When nothing is sent from the database, that is from the computer (325) holding the database, then a default step, the making step (125), is taken by the smart phone (305). Preferably, when there is no second telephone number in the database, the database will send to the smart phone (305) an acknowledgement that nothing will be returned to the smart phone (305), which would then enable the smart phone (305) to then immediately thereafter transmit the originally dialed digits to the Public Switched Telephone Network (340) to make the call.

It is also conceivable that the database may not send data in a timely manner, for example, within a prescribed period of time. In that event, the smart phone (305) will then also implement the making step (125) and transmit the originally dialed digits to the Public Switched Telephone Network (340) to make the call.

Thus, the making step (125) handles this default condition by dialing the digits originally dialed by the user. The making step (125) involves the smart phone (305) automatically making or transmitting the phone number originally dialed by the user when either no second telephone is sent from the database on the computer (325) or is not sent within a prescribed period of time to the Public Switched Telephone Network (340).

Thus, the making step (125) is making a voice call through a Public Switched Telephone Network (340) using the digits originally dialed by the user, said making occurring automatically and without user action when the second telephone number or any such multimedia information: is not sent to the smart phone (305) from the database; or is not sent to the smart phone (305) from the database within a defined period of time.

When the data sent from the computer (325), i.e. the database, includes both the second telephone number and multimedia information, the smart phone (305) will play the audio or display the visual information for the user. The user may then wish to act on that information first before the smart phone (305) places the call using the second telephone number.

Thus, the displaying step (130) involves the smart phone (305) implementing the step of displaying the multimedia information on the display screen when such multimedia information is displayable. All utilizations of the multimedia information may be implemented by the smart phone (305), such as playing audio together with displaying visual information, or simply playing audio.

The displaying step (130) does not have to be performed before the smart phone (305) transmits the second telephone number to the Public Switched Telephone Network (340). Preferably, any playing of audio and/or displaying of visual information would occur simultaneously with the voice call establishment through the Public Switched Telephone Network (340). For example, a digital coupon might be displayed to encourage the caller to buy something. In addition, the company being called may prefer to have the displaying step occurring first. Such company might want to provide a menu of options, for instance.

The using step (135) involves the smart phone (305) transmitting the second telephone number received from the computer (325), that is the database, to the Public Switched Telephone Network (340) to contact the business or other party originally dialed by the user. The using step (135) is preferably transparent to the user. This means that it preferably occurs without user action either before or after playing or displaying any multimedia data also sent.

Thus, the using step (135) is using the second telephone number received from the database to cause the smart phone (305) to establish a voice connection (320) through the Public Switched Telephone Network (340) as if the second telephone number had been dialed by the user.

The method (100) may be implemented as a computer program product for use on a smart phone (305). This computer program product is also popularly known as an application or an app. The application includes computer readable program code adapted to be executed on the smart phone (305) to implement the method (100) supplementing voice telephone services. Thus, the method (100) implemented as a computer program product is the same as the method (100) as described above. The application is embodied in nontransitory memory, which is again a hardware component usable by the smart phone (305).

Figure 4:
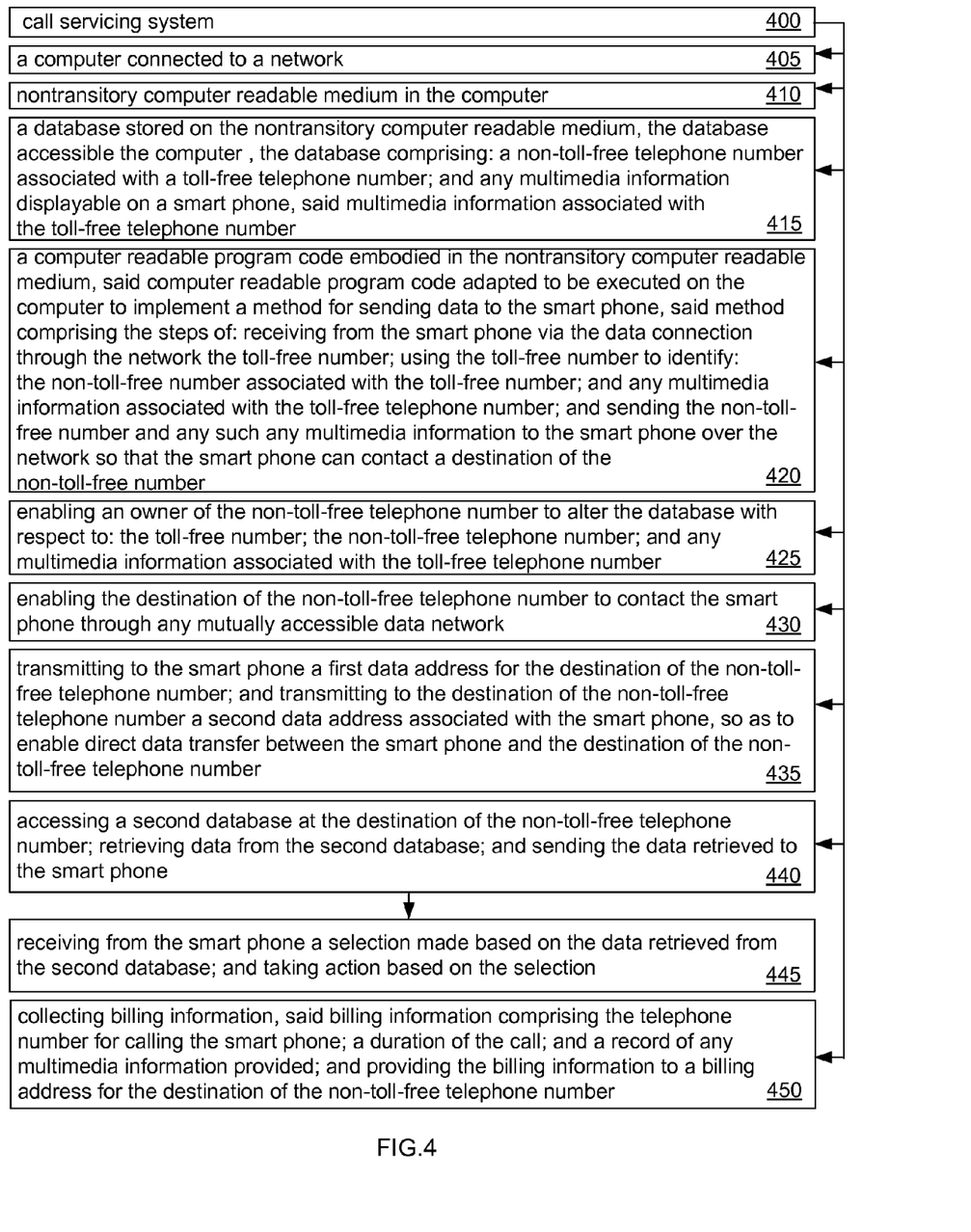
FIG. 4 is a chart illustrating the call servicing system responding to the smart phone.

The method (100) may be implemented from the perspective of the actions taken by the computer (325) accessing the database and responding to the data sent by the smart phone (305). The computer (325) may be thought of as a call servicing system (400) as shown in FIG. 4.

The call servicing system (400) includes a first component (405), which is a computer (325) connected to a network. This is the data network (315) used in the method (100).

The call servicing system (400) includes a second component (410), which is nontransitory computer readable medium in the computer (325). Nontransitory computer readable medium is hardware based non-volatile computer memory, such as random access memory or any number of other hardware memory devices that are computer readable.

The call servicing system (400) includes a third component (415), which is a database stored on the nontransitory computer readable medium. The database is accessible to the computer (325). The database includes: a non-toll-free telephone number associated with a toll-free telephone number. In use, the database will have many such non-toll-free numbers with each associated with a toll-free telephone number. In addition, the database may have multimedia information displayable on a smart phone (305) that is also associated with the toll-free telephone number. For example, should a business having a toll-free number want to send a map or a recorded explanation to a smart phone dialing its toll-free number, then it would be stored in the database for transmission to the smart phone (305) with the non-toll-free number, namely the second telephone number discussed above.

The call servicing system (400) includes a fourth component (420), which is a computer readable program code embodied in the nontransitory computer readable medium. This computer readable program code is used to respond to the smart phone (305) when it implements the method described above.

This computer readable program code is adapted to be executed on the computer to implement a method for sending data to the smart phone (305). The method includes steps of: receiving from the smart phone (305) via the data connection (310) through the network the toll-free number; using the toll-free number to identify: the non-toll-free number associated with the toll-free number; and any multimedia information associated with the toll-free telephone number; and sending the non-toll-free number and any such any multimedia information to the smart phone (305) over the network so that the smart phone (305) can contact a destination (335) of the non-toll-free number.

Optional steps implemented by computer readable program on the computer (325) include:

A first optional step (425) of enabling an owner of the non-toll-free telephone number to alter the database with respect to: the toll-free number; the non-toll-free telephone number; and any multimedia information associated with the toll-free telephone number.

A second optional step (430) of enabling the destination (335) of the non-toll-free telephone number to contact the smart phone (305) through any mutually accessible data network (315). Such data network (315) may be any network accessible to the smart phone (305) and the destination (335). Such contact may or may not be routed through the computer (325). In one example, there may be two logical connections: one between a destination smart phone and the database and one between the destination smart phone and the originating smart phone. In such example, both logical connections might use the same Internet Protocol addresses but with different port numbers. In another example, there might be more than one destination: A first could be a data only connection to a computer-telephony integration system that controls the business owners call center and provides the caller with a list of menu options; and a second could be a voice and data destination when a voice call is made to a call center agent who has an associated personal computer.

A third optional step (435) is a combination of two steps: transmitting to the smart phone (305) a first data address for the destination (335) of the non-toll-free telephone number; and transmitting to the destination (335) of the non-toll-free telephone number a second data address associated with the smart phone (305), so as to enable direct data transfer between the smart phone (305) and the destination (335) of the non-toll-free telephone number. Examples include a 2-way video added to the call and the agent at the destination (335) might send pictures of the product being sold.

A fourth optional step (440) is a combination of four steps: accessing a second database at the destination (335) of the non-toll-free telephone number; retrieving data from the second database; and sending the data retrieved to the smart phone (305).

A fifth optional step (445) occurs when there is data retrieved and sent to the smart phone (305) upon implementation of the fourth optional step (440). When the smart phone (305) receives the data retrieved by the computer (325) from the second database, the user of the smart phone (305) may make a selection based on that data. Preferably, the selection is then sent to the computer (325), which then re-transmits it to the second database or sends the smart phone (325) additional data (such as a coupon or a third telephone number based on the selection. Thus, the fifth optional step (445) includes steps of receiving from the smart phone (305) a selection made based on the data retrieved from the second database; and taking action based on the selection.

A sixth optional step (450) collecting billing information, said billing information comprising the telephone number for calling the smart phone (305); a duration of the call; and a record of any multimedia information provided; and providing the billing information to a billing address for the destination of the non-toll-free telephone number. The billing information would not necessarily go to the physical location of the destination phone. Rather, the bill would go to the administrative office of the destination (335) business owner.

EXAMPLE 1

Enhanced Toll-Free Services

A toll-free business owner purchases Enhanced Voice Call service, which is implemented by the app implementing the invention. Then, at the database on the computer (325), the toll-free number is correlated with a standard non-toll-free number. The non-toll-free number will be returned back to a smart phone app over data connection (310). If the toll-free business owner had not purchased the Enhanced Voice Call service, then a negative indicator is returned back to the smart phone (305) and the call is dialed as a toll-free call into the Public Switched Telephone Network. Alternatively, the database on the computer (325) may retrieve desired business information from a separate database owned by the toll-free business owner. This would give the business owner more control over the multimedia interaction with its customer. Additionally, the toll-free business owner has the option of sending multimedia information to the caller's smart phone that the business owner had preloaded, such as a digital coupon or advertising info. The Enhanced Voice Call Application displays this information to the caller. The Enhanced Voice Call Application also then utilizes the second number returned from the database on the computer (325) to cause the smart phone (305) to transmit the second number to the Public Switched Telephone Network over a voice connection (320) as a standard domestic call. The call then routes through the Public Switched Telephone Network to an end point or destination.

Since the call was routed as a standard domestic call through the Public Switched Telephone Network, the legacy toll-free infrastructure is not used to dial a toll-free number. So, the business owner of the toll-free number is not charged for the call by the legacy toll-free provider. Since the caller using the smart phone (305) has subscribed to unlimited voice and data, the caller is not charged. The business owner of the toll-free number may be charged by the provider of the Enhanced Voice Call service. Since the service is enhanced, this may be at a higher rate than traditional Public Switched Telephone Network toll-free service. Alternatively, since the expensive legacy toll-free infrastructure is bypassed, there may be an opportunity for a price reduction. This would be negotiated using standard business practices. Note that if the wireless subscriber did not have unlimited voice usage, that subscriber may still choose to utilize Enhanced Voice Call Application, since this processing would typically have no impact on the charging of the toll-free processing. The subscriber would be charged the same minutes of use for toll-free calls if Enhanced Voice Call Application is used or not.

Wireless subscribers may be offered an incentive to encourage them to download the application. Since wireless subscribers typically pay to download new applications, the subscriber could be provided with a one-time credit to download the app. Alternatively, the enhanced nature of the service may be incentive enough to encourage subscribers to download the app in order to access incentives such as digital coupons when calling businesses using this service.

EXAMPLE 2

Enhanced Services for the Business Owner

After a voice call has been established to the call destination and in this example, the destination or terminating party also has access to complementary Enhanced Voice Call Application software, provided to implement this invention. In this example, the complementary Enhanced Voice Call Application software is located in a personal computer and data connection is established by the application software to the computer (325), also referred to as the database. The data connection (310) is used to enable the personal computer to connect to the data network (315), such as the Internet, in order to gain access to the session that has been established between Enhanced Voice Call Application software and the smart phone (305). The telephone number of the customer is provided to that personal computer.

The Enhanced Voice Call Application software forwards the caller's smart phone number to the computer (325) and that, plus knowledge of the dialed toll-free number is used to access the session. Once the session is accessed, information about the data address of the smart phone (305) caller plus the codecs supported by the smart phone (305) is sent by the computer (325) over data connection, which then enables the Enhanced Voice Call Application to establish a peer-to-peer data connection through the data network (315) and send an offer to augment the already established voice call with a multimedia information, which the caller could optionally accept. The media used may be audio and/or video sent to the display screen of the smart phone (305).

EXAMPLE 3

Non-Toll-Free Calls

Any time a data session is established from the originating phone to the computer (325) by the smart phone (305) using the method disclosed herein and the destination or terminating phone also has access to Enhanced Voice Call Application software, then a multimedia session may be established between the phones on a data network. In this example, a caller updates Enhanced Voice Call Application tables in the database to enable opening a session on the computer (325) for members of a social media group or members of a work group. Alternatively, the Enhanced Voice Call Application software always establishes a data session for all calls made by the smart phone (305). Whenever a data session is established, then a multimedia session may be established.

A caller with a first smart phone having the app implementing the method disclosed above dials the digits and transmits to make a call to a second smart phone with the app. Instead of transmitting the dialed numbers to the Public Switched Telephone Network (340), the app creates a data session with the computer (325). The computer (325) then instructs the app to process the call as dialed through the Public Switched Telephone Network (340). A voice call then routes through Public Switched Telephone Network (340) over wireless "line" to a person with a smart phone and the app. The app on the second smart phone then uses the calling number of first smart phone, which is transmitted through the Public Switched Telephone Network, to access a data session between the app and the computer (325) by sending a message to the computer (325) over the data connection (310). Once session access is established, then the computer (325) returns the data address of first smart phone and the codecs supported by the first smart phone to the app on the second smart phone. The app is then able to offer to establish a peer-to-peer multimedia session with the first smart phone over the data connection (310) through the data network (315), such as the Internet. If both parties in the call are members of a work group or a social media group, then the app may be configured to establish the multimedia session automatically. If not, then permission would be required to establish the multimedia session.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the telecommunications industry.

What is claimed is:

1. A method of automatically dialing a non-toll free number when a toll free number is dialed on a smart phone, the smart phone comprising a display screen and nontransitory memory storing computer readable program code adapted to be executed on the smart phone to implement steps enhancing voice telephone services to a user dialing a telephone number, the method comprising the steps of:
    capturing digits dialed on the smart phone, the digits consisting of ten digits of a toll free telephone number of a business;
    establishing a data connection with a database external to the smart phone and accessible to the smart phone using network access, said data connection based upon the digits dialed on the smart phone;
    transmitting to the database from the smart phone:
        the digits dialed on the smart phone; and
        a telephone number for calling the smart phone;
    receiving at the smart phone a second telephone number sent from the database, said second telephone number derived from the digits dialed on the smart phone;
    using the second telephone number received from the database to cause without user action the smart phone to establish a voice connection through the public switched telephone network as if the second telephone number had been dialed by the user.

2. The method of claim 1, wherein said data connection based upon the digits dialed on the smart phone is defined by the data connection made only when predetermined digits are dialed by the user.

3. The method of claim 2, wherein the predetermined digits is alterable by the user or other person having access to the smart phone.

4. The method of claim 1, further comprising the step of manually activating the computer readable program code prior to capturing digits dialed on the smart phone.

5. A computer program product for use on a smart phone, the smart phone comprising a display screen, the computer program product comprising an application embodied in nontransitory memory usable by the smart phone, the application comprising computer readable program code adapted to be executed on the smart phone to implement a method supplementing voice telephone services to automatically dial a non-toll free number when a toll free number is dialed, said method comprising the steps of:
    capturing digits dialed on the smart phone, the digits consisting of ten digits of a toll free telephone number of a business;
    establishing a data connection with a database on a computer and accessible to the smart phone using network access, said data connection based upon the digits dialed on the smart phone;
    transmitting to the database from the smart phone:
        the digits dialed on the smart phone;
        a telephone number for calling the smart phone; and
        any multimedia capabilities of the smart phone, said multimedia capabilities comprising: a codec supported by the smart phone, a data address associated with the smart phone, and data necessary to enable provision of multimedia service via the smart phone;
    receiving via network access, at the smart phone, data from the database, the data comprising: a second telephone number derived from the digits dialed on the smart phone; and any multimedia information accessible on the smart phone;
    displaying any multimedia information that is displayable on the display screen; and using the second telephone number received from the database to cause without user action the smart phone to establish a voice connection through a public switched telephone network as if the second telephone number had been dialed on the smart phone.

6. A call servicing system supporting a smart phone automatically dialing a non-toll free number when a toll free number is dialed on the smart phone, the call servicing system comprising:
 a computer connected to a network,
 nontransitory computer readable medium in the computer;
 a database stored on the nontransitory computer readable medium, the database accessible to the computer, the database comprising: a non-toll-free telephone number associated with a toll-free telephone number, the toll-free number consisting of ten digits of a toll free telephone number of a business; and any multimedia information displayable on a smart phone, said multimedia information associated with the toll-free telephone number;
 a computer readable program code embodied in the nontransitory computer readable medium, said computer readable program code adapted to be executed on the computer to implement a method for sending data to the smart phone, said method comprising the steps of:
 receiving from the smart phone via the data connection through the network the toll-free number;
 using the toll-free number to identify:
  the non-toll-free number associated with the toll-free number; and
  any multimedia information associated with the toll-free telephone number; and
 sending the non-toll-free number and any such any multimedia information to the smart phone over the network so that the smart phone can contact without user action a destination of the non-toll-free number.

7. The call servicing system of claim 6, wherein the method implemented by the computer readable program code further comprises the step of enabling an owner of the non-toll-free telephone number to alter the database with respect to: the toll-free number; the non-toll-free telephone number; and any multimedia information associated with the toll-free telephone number.

8. The call servicing system of claim 6, wherein the method implemented by the computer readable program code further comprises the step of enabling the destination of the non-toll-free telephone number to contact the smart phone through any mutually accessible data network.

9. The call servicing system of claim 6, wherein the method implemented by the computer readable program code further comprises the steps of:
 transmitting to the smart phone a first data address for the destination of the non-toll-free telephone number; and
 transmitting to the destination of the non-toll-free telephone number a second data address associated with the smart phone, so as to enable direct data transfer between the smart phone and the destination of the non-toll-free telephone number.

10. The call servicing system of claim 6, wherein the method implemented by the computer readable program code further comprises the steps of:
 accessing a second database at the destination of the non-toll-free telephone number;
 retrieving data from the second database; and
 sending the data retrieved to the smart phone.

11. The call servicing system of claim 10, wherein the method implemented by the computer readable program code further comprises the steps of:
 receiving from the smart phone a selection made based on the data retrieved from the second database; and
 taking action based on the selection.

12. The call servicing system of claim 6, wherein the method implemented by the computer readable program code further comprises the steps of:
 collecting billing information, said billing information comprising the telephone number for calling the smart phone; a duration of the call; and a record of any multimedia information provided; and
 providing the billing information to a billing address for the destination of the non-toll-free telephone number.

* * * * *